March 11, 1958  S. KIRZNER  2,826,189
DRESSING TOOL HOLDER
Filed July 27, 1956  2 Sheets-Sheet 1
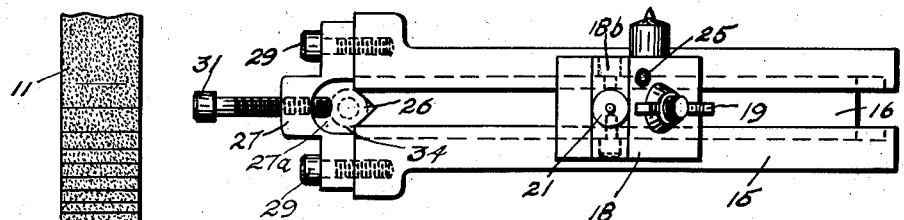
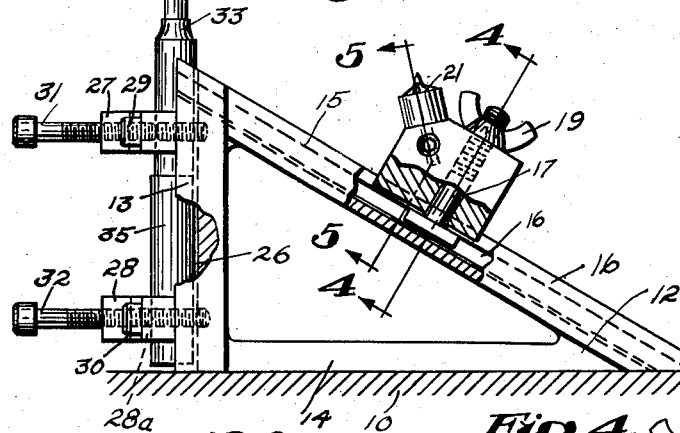
Inventor:
Samuel Kirzner,
by Arthur D. Thomson
Attorney March 11, 1958  S. KIRZNER  2,826,189
DRESSING TOOL HOLDER Filed July 27, 1956  2 Sheets-Sheet 2

Inventor:
Samuel Kirzner,
by Arthur D. Thomson
Attorney

United States Patent Office

2,826,189
Patented Mar. 11, 1958

2,826,189

DRESSING TOOL HOLDER

Samuel Kirzner, Boston, Mass., assignor of one-half to Henry A. Alpern, Sharon, Mass.

Application July 27, 1956, Serial No. 600,422

5 Claims. (Cl. 125—11)

This invention relates to tool holders, the holder here disclosed being intended primarily for mounting a diamond wheel-dressing tool on a grinding machine.

Most tool holders presently used for mounting diamond dressing tools support the tool in a fixed position, and it is necessary to raise or lower the grinding wheel to the level of the tool each time the wheel is to be dressed. The vertical motion of the wheel on a grinding machine is ordinarily controlled by a fine micrometer feed. Consequently, considerable time is lost in moving the wheel up and down for dressing, if the level of the dressing tool is a long way from the level of the work.

The principal object of this invention is to provide a tool holder which allows for quick adjustment of the dressing tool to the level of the grinding wheel over a wide range, so that loss of time in dressing the wheel can be kept to a minimum. Another object is to provide a tool holder which is adaptable for either rim or side dressing. Still another object is to provide a tool holder which can be used to support pieces of work, such as punches for grinding. Other objects and advantages of the invention will be apparent from the following description:

In the drawings illustrating the invention:

Fig. 1 is a side elevation of a tool holder constructed according to the invention, mounted in position for grinding a punch;

Fig. 2 is a side elevation of the tool holder arranged for dressing the rim of a grinding wheel;

Fig. 3 is a plan view of the tool holder;

Fig. 4 is a cross-section taken along line 4—4 of Fig. 1;

Fig. 5 is a cross-section taken along line 5—5 of Fig. 1;

Figure 6:
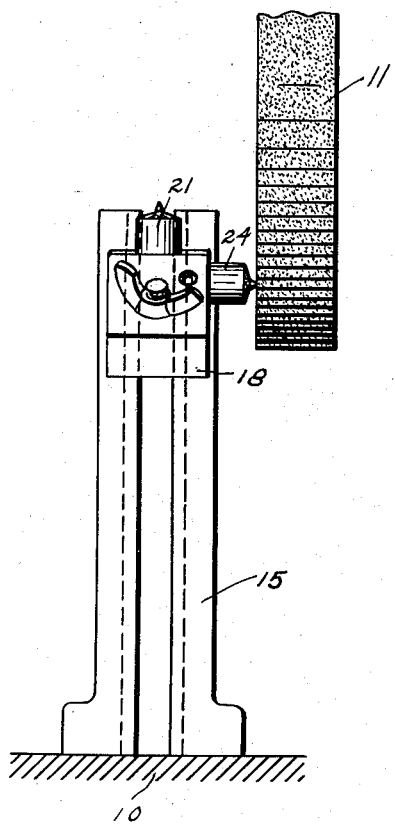
Fig. 6 is a rear elevation of the tool holder arranged for side dressing a wheel.

The tool holder is intended for use on a conventional grinding machine employing a magnetic work table 10 and a grinding wheel 11. The holder includes a triangular frame 12 having a short leg 13, a long leg 14 at right angles to leg 13, and a hypotenuse leg 15. The legs are here illustrated as arranged in the form of a 60°-30° right triangle but the acute angles may be varied as long as one of the right angle legs is appreciably longer than the other. The outer faces 13a and 14a of legs 13 and 14 are machined true and accurately at right angles to one another.

Disposed in leg 15 is a keyway 16 in which the square head 17a of a bolt 17 is slidably received. A block 18 is mounted on bolt 17 and secured by means of a wing nut 19. Block 18 has a key ridge 18a, which is normally engaged between the portions 15a and 15b of leg 15 which overhang the keyway 16 and prevents the block from turning. When nut 19 is loosened, the block may be slid along leg 15, and the nut can then be tightened to clamp the block in any desired position. When the nut is loosened enough, block 18 can be lifted to free key 18a from portions 15a and 15b, and turned around on bolt 18 to a reversed position.

Block 18 has a recess 20 in which the stem 21a of a diamond tipped dressing tool 21 is received. A set screw 22, threaded into the block from the side, engages stem 21a to hold the dressing tool in place. The block has a bevelled face 18b on which tool 21 rests. Face 18b and recess 20 are so disposed that tool 21 tilts slightly toward leg 13. The block also has a horizontal recess 23 in which the stem 24a of a second diamond tipped dressing tool 24 is received. This tool is secured by a set screw 25 threaded into the block.

Centrally disposed along leg 13 is a V-groove 26. A pair of brackets 27 and 28 are removably secured to leg 13 by pairs of screws 29 and 30, respectively, and are arranged to straddle groove 26, and have central recesses 27a and 28a. A screw 31 is threaded into the central part of bracket 27 and a screw 32 is similarly threaded into bracket 28.

Bracket 27 can be used to mount a small tool, for example a punch 33, which is to be ground. The punch, the position of which is indicated in dot and dash lines in Fig. 3, is centered in the V-groove 26 and secured by screw 31. To facilitate grinding a number of punches of the same length in succession, a piece of rod 35 may be mounted in bracket 28 to serve as a stop. The rod may be adjusted to the desired height, and clamped by means of screw 32. Thereafter, a number of punches of the same length can be dropped into the holder in succession and ground with the same wheel setting.

Figure 7:
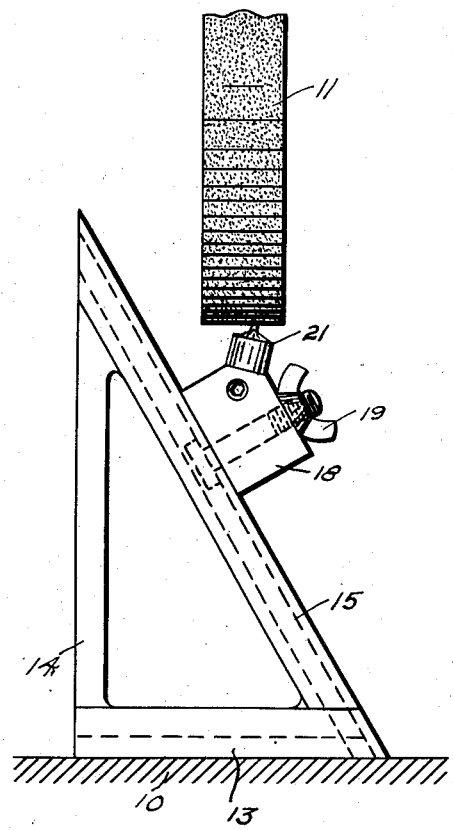
Fig. 7 is a side elevation of the tool holder arranged in an alternative position.

To obtain a greater range of height adjustment for the dressing tool, the brackets 27 and 28 can be removed and the frame 12 turned to rest on leg 13. Block 18 is reversed by loosening nut 19, as previously explained, to bring tool 21 to the top. Fig. 7 illustrates tool 21 being used for dressing the face of a wheel with the holder in this position. It will be noted that tool 21 tilts slightly away from leg 14 in this position of the holder. The fact that, in both positions of the holder, the diamond tip is slightly tilted with respect to the face of the wheel, instead of having its point directly facing the wheel, improves the performance of the tool, as the tip is worn, in such a manner as to maintain its sharpness. The tool 21 can, furthermore, be rotated, by loosening set screw 22 so as to equalize wear on the diamond. Fig. 6 illustrates tool 24 being used for dressing the side of a wheel.

The tool holder here described is simple in construction and provides a wide range of adjustment for a dressing tool, so that the latter can usually be mounted close to the level of the work which is being ground. The holder is readily adapted for either face dressing or side dressing. When used as a work holder for small pieces, such as punches, the holder has an added advantage in that the work and the dressing tool are mounted as a single unit.

What is claimed is:

1. A tool holder, for use on grinding machines, comprising a generally triangular frame having two flat surfaces disposed at right angles to one another and an oblique leg, a block mounted to slide along said leg and having means for mounting a dressing tool to face upward, said block being reversible on said leg so that a tool mounted thereon can be turned to face upward when the frame rests on either of said surfaces, and means for releasably clamping said block to said leg.

2. A tool holder, for use on grinding machines, comprising a generally triangular frame having a first leg, a second leg perpendicular to the first leg, and a third leg oblique to the first and second leg, the first leg being longer than the second leg, a block mounted to slide along said third leg, and having means for mounting a dressing tool to face upward, and means for releasably clamping said block to said third leg, said block, upon release of said clamping means, being reversible to turn said tool to face upward when the frame rests on either of the first two legs.

3. A tool holder as described in claim 2, said tools mounting means being adapted to hold the tool at all times in an oblique position with respect to said first and second legs.

4. A tool holder, for use on grinding machines, comprising a generally triangular frame having a horizontal leg, a vertical leg, and an inclined leg, a keyway in said inclined leg, a bolt having a rectangular head slidably received in said keyway, a block mounted on said bolt, a nut engaging said bolt to clamp said block to said inclined leg, said block being slidable along the latter when the nut is loosened, a key ridge on said block, said inclined leg having portions normally engaging said ridge to prevent the block from turning, and means on said block for mounting a pointed dressing tool with its point upward.

5. A tool holder as described in claim 4, said block having means for mounting a second pointed dressing tool with its point disposed horizontally.

References Cited in the file of this patent
UNITED STATES PATENTS

| | | |
|---|---|---|
| 1,236,898 | Barnes | Aug. 14, 1917 |
| 2,242,792 | Panzer | May 20, 1941 |